United States Patent [19]

Rose et al.

[11] 4,421,811
[45] * Dec. 20, 1983

[54] METHOD OF MANUFACTURING DOUBLE LAYER ATTENUATION PANEL WITH TWO LAYERS OF LINEAR TYPE MATERIAL

[75] Inventors: Philip M. Rose, Chula Vista; Frank J. Riel, San Diego, both of Calif.

[73] Assignee: Rohr Industries, Inc., Chula Vista, Calif.

[ * ] Notice: The portion of the term of this patent subsequent to Oct. 13, 1998 has been disclaimed.

[21] Appl. No.: 106,146

[22] Filed: Dec. 21, 1979

[51] Int. Cl.³ .......................... B32B 3/12; E04B 1/82
[52] U.S. Cl. ...................................... 428/116; 52/794; 52/808; 156/182; 156/249; 156/280; 156/292; 156/307.5; 156/307.7; 156/315; 156/327; 181/286; 181/292; 428/193
[58] Field of Search ............... 156/182, 307.5, 249, 156/307.7, 280, 315, 292, 327; 428/116, 322, 305, 193; 52/794, 808; 181/286, 292; 156/253

[56] References Cited

U.S. PATENT DOCUMENTS

| | | | |
|---|---|---|---|
| 1,560,712 | 11/1925 | Naylor | 428/193 |
| 2,731,378 | 1/1956 | Strachan | 156/64 |
| 2,925,193 | 2/1960 | Gibb | 156/91 |
| 2,952,579 | 9/1960 | Merriman | 428/118 |
| 3,044,919 | 7/1962 | Stoneburner | 156/71 |
| 3,166,149 | 1/1965 | Hulse et al. | 428/116 X |
| 3,327,866 | 6/1967 | Pall et al. | 428/685 X |
| 3,332,816 | 7/1967 | Kalinowski | 156/307.7 |
| 3,670,843 | 6/1972 | Kelly et al. | 181/292 |
| 3,690,606 | 9/1972 | Pall | 428/116 X |
| 3,693,750 | 9/1972 | Takkunen | 428/116 X |
| 3,948,346 | 4/1976 | Schlinder | 181/286 |
| 3,977,492 | 8/1976 | Hankel | 181/292 |
| 4,001,473 | 1/1977 | Cook | 428/116 |
| 4,254,171 | 3/1981 | Beggs et al. | 156/182 |
| 4,269,882 | 5/1981 | Carrillo et al. | 428/116 |
| 4,294,329 | 10/1981 | Rose et al. | 181/292 |

FOREIGN PATENT DOCUMENTS 1373063 11/1974 United Kingdom ............... 428/116

Primary Examiner—John J. Gallagher
Attorney, Agent, or Firm—Patrick J. Schlesinger; Frank D. Gilliam

[57] ABSTRACT

A method of manufacturing a double degree acoustic attenuation sandwich panel having a plurality of stacked components adhered together to form a unitary sandwich structure. The structure comprising an impervious facing of thin sheet material, a first honeycomb core with end wise directed cells, a first perforate facing of thin sheet material, a first thin layer of porous fibrous material, a second perforated facing of thin sheet material, a second honeycomb core with end wise directed cells, a third perforate facing of thin sheet material, the second perforated facing sheet having substantially larger perforations than the first and third sheets, and a second layer of porous fibrous material. The resulting sandwich panel has a pre-determined flow through resistance between the outer surface of the first and second layers of porous fibrous material and the cells of the first and second honeycomb cores. The cells of the first and second honeycomb cores may be of equal or different volume and may be constructed of similar of dissimilar materials.

6 Claims, 6 Drawing Figures

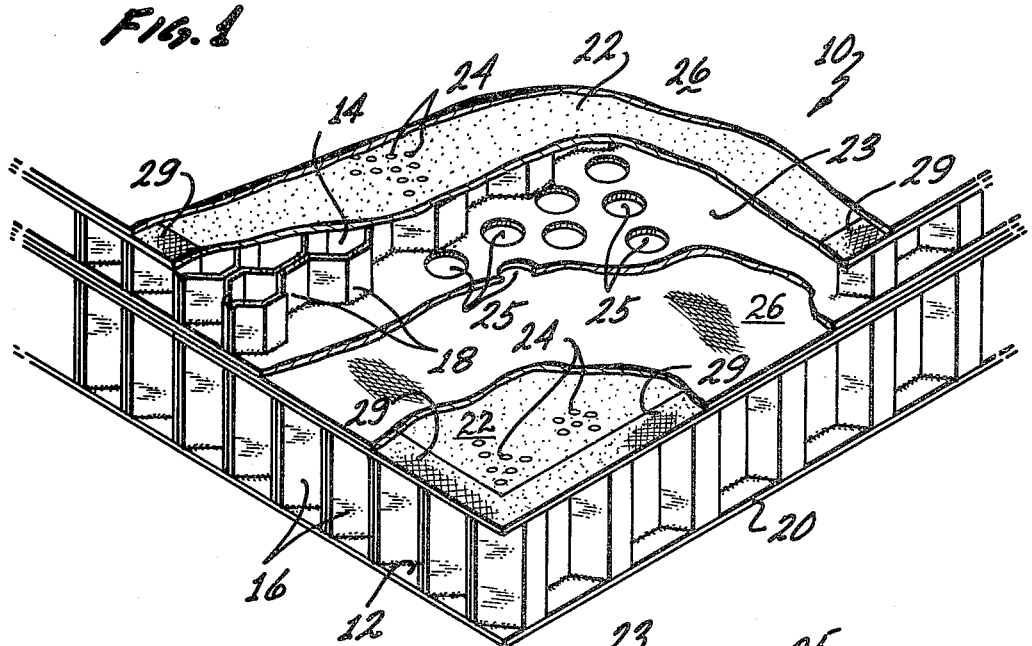
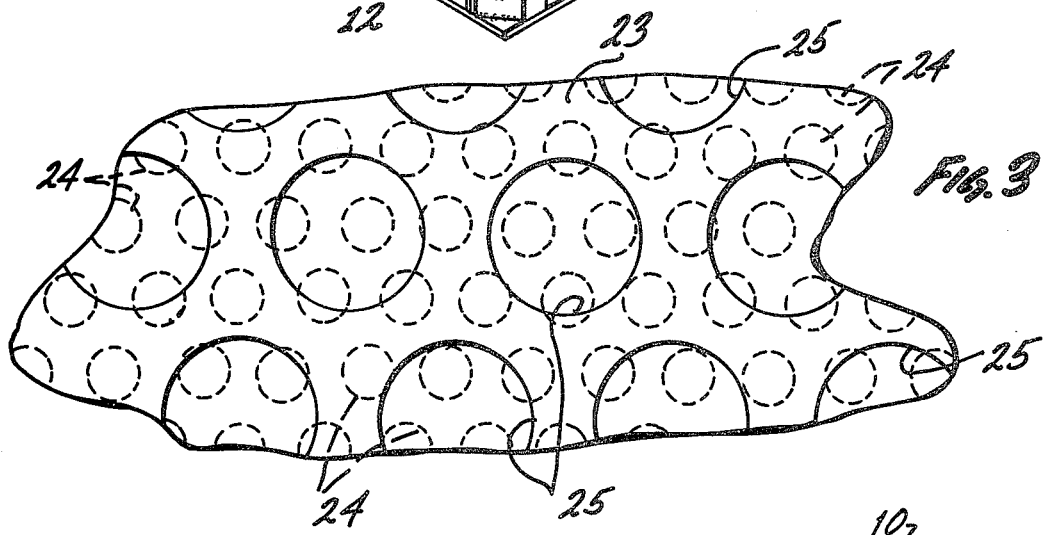
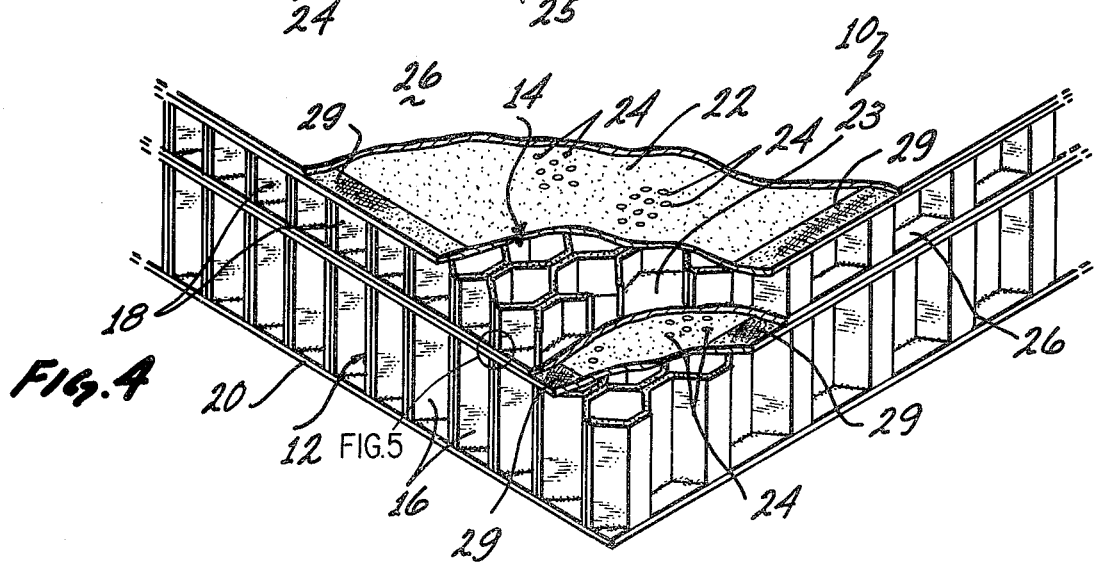

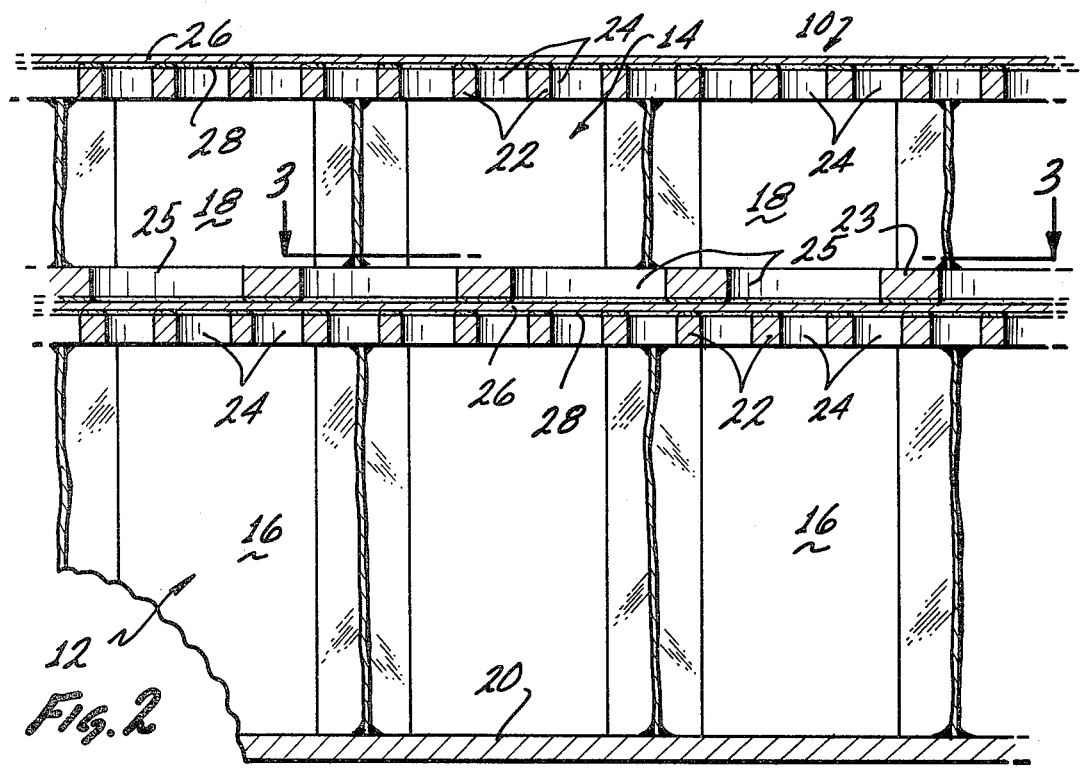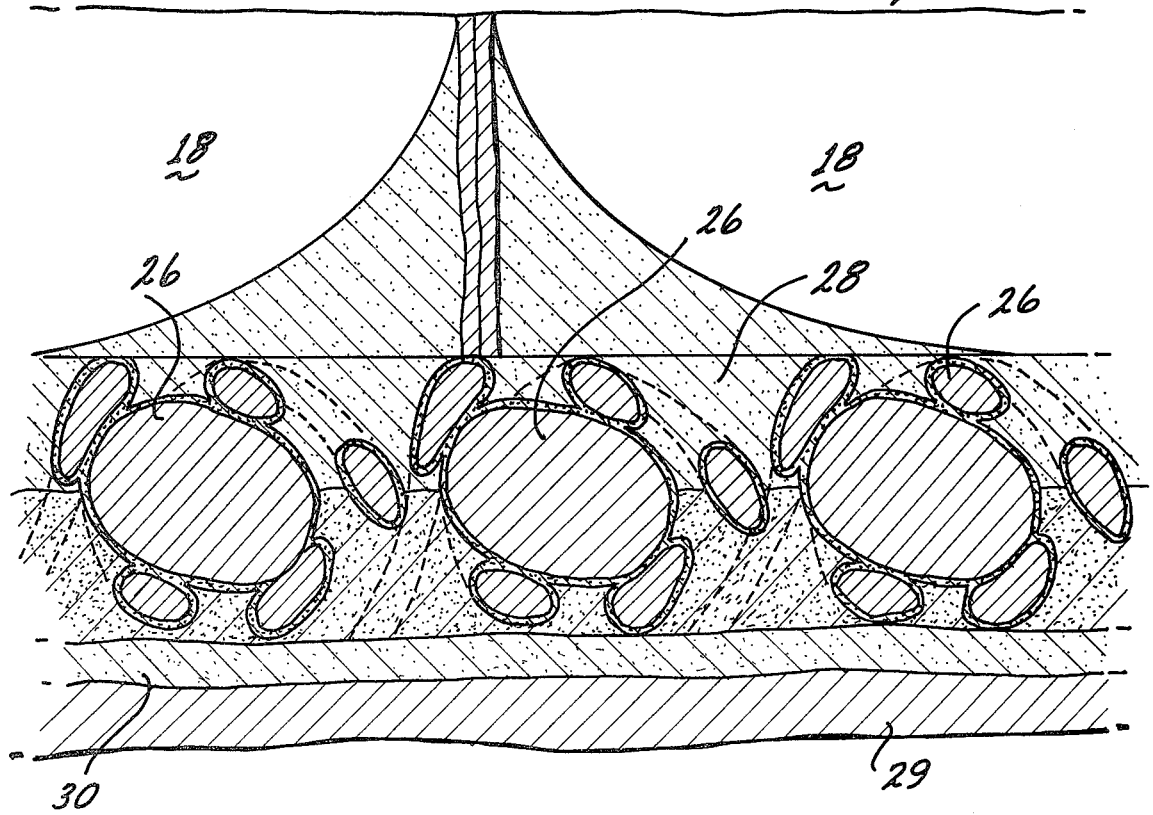

METHOD OF MANUFACTURING DOUBLE LAYER ATTENUATION PANEL WITH TWO LAYERS OF LINEAR TYPE MATERIAL

BACKGROUND OF THE INVENTION

This invention relates to a method of manufacturing an improved noise attenuation structure, more particularly to a method of manufacturing a structure having a first impervious facing sheet adhered to one surface of a first honeycomb core, a first perforate facing sheet with a first layer of porous fibrous material adhered to the other surface of the first honeycomb core, a second perforated facing sheet adhered to the porous fibrous woven material, the opposite surface of the second perforated sheet adhered to one surface of a second honeycomb core and the other surface of the second honeycomb core adhered to a third perforated facing sheet with a second layer of porous fibrous material secured to the outside or opposite surface of the third perforated sheet. A continuous communication at a predetermined flow resistance between the cells of the first and second cores and the outer surface of the second layer of porous fibrous woven material which is positioned adjacent the noise to be attenuated is maintained. The attenuation structure is specifically suitable for use in a severe environment, such as, high speed gas flow surfaces of modern aircraft. The cells of the first and second cores may be of the same or different volumes to attenuate various different noise frequencies.

In manufacturing sound attenuation metal honeycomb sandwich panels which are exposed to the above mentioned extreme environment while exposed to the sound produced by modern turbine aircraft engines, it is common practice to provide a cellular structure utilizing the Helmholtz resonating cavity principle, wherein a first thin imperforate sheet of material is bonded to one core surface of a sheet of cellular core material and a thin perforate sheet of material is bonded to the opposite core surface.

Panels of this type of construction although satisfactory for a certain degree of sound attenuation for a narrow range of sound frequencies, are found to be inefficient noise attenuation structure both for level of attenuation and for broad band noise frequencies customarily encountered in and around modern aircraft jet engines. Additionally it has been found that the perforations through the perforated sheet exposed directly to a high speed flow of air thereacross creates some turbulence to that air flow and the acoustic performance is generally effected by the grazing air flow.

Other concepts have been included interposing a sheet of fibrous material between the perforated sheet and the core surface. This has proven to be unsound acoustically when used adjacent to high speed gas flow.

Attempts to successfully manufacture this and various other adhesive bonded sandwich sound attenuation material of this general type have resulted in the adhesive used for the bonding to ooze or wick into the perforations and at least partially filling some of these perforations reducing the effective open area which increases the flow resistance between the sound source and the resonating cavities formed by the core cells. When the number and size of the perforations are increased to overcome this deficiency, the structural strength is reduced and air flow turbulence is increased. In those structures where porous fibrous material is utilized within the sandwich between the outer perforate surface and the central core, the adhesive is found to wick by capillary action into the pores and around the fibers of the porous fibrous material as well as the perforations through the perforated material further reducing the sound attenuation effectiveness of the resulting structure.

SUMMARY OF THE INVENTION

It is the primary object of this invention to produce a double degree highly efficient sound attenuation structure wherein the perforations and the porous fibrous material is substantially free of any adhesive materials.

Another object of this invention is to produce a sound attenuation panel wherein the flow resistance from the outer surface to the stacked honeycomb core cells can be predicted and controlled.

Still another object of this invention is to provide a double degree sound attenuation material that has structural integrity when utilized in a severe environment for sound attenuation.

A still further object is to provide an adhesive bonding medium that provides isolation between dissimilar metal and provides a funneling effect between the perforated sheets and their adjacent sheets of porous fibrous woven material which results in an effectively greater open area.

These and other objects and advantages of the invention will become better understood by reference to the following detailed description when considered together with the accompanying drawings, in which:

BRIEF DESCRIPTION OF THE DRAWINGS

FIG. 1 is a perspective view of a first embodiment of the sound attenuation sandwich panel manufactured by the method of the instant invention.

FIG. 2 is a fragmentary vertical section of the sandwich panel of FIG. 1.

FIG. 3 is an enlarged section of FIG. 1 showing the perforation size of the central perforate sheet and one of the outer perforated sheets.

FIG. 4 is a perspective view of a second embodiment of the sound attenuation sandwich panel manufactured by the method of the instant invention.

FIG. 5 is a micrograph of a section of the attenuation panel taken along line 5—5 of FIG. 4.

DETAILED DESCRIPTION OF THE PREFERRED EMBODIMENT OF THE INVENTION

Figure 6:
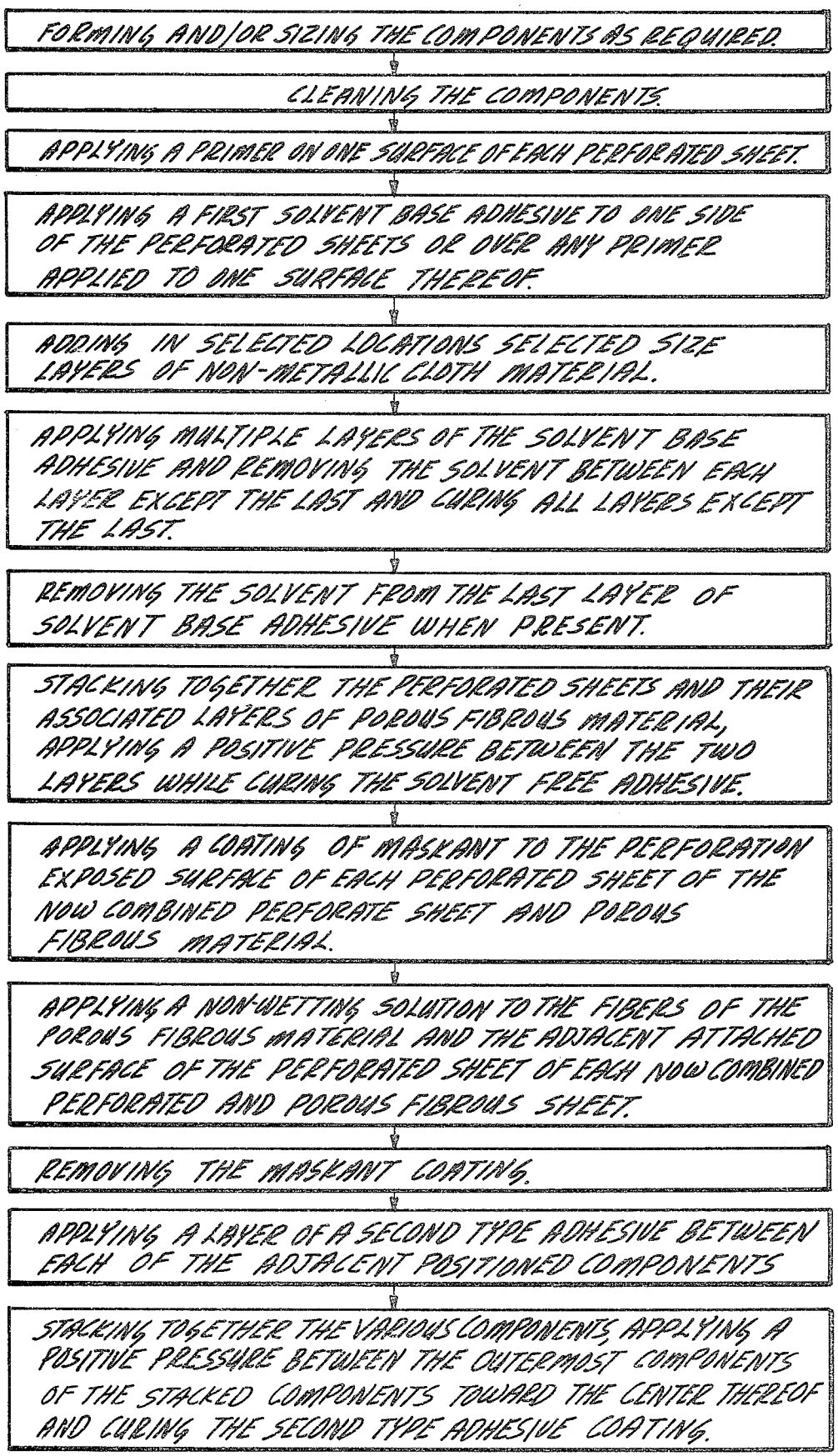
FIG. 6 is a flow diagram of the steps of the method of manufacturing the attenuation panels of FIGS. 1 and 4.

Referring now to the various figures in detail, the attenuation sandwich structure 10 manufactured by the method of the instant invention comprises two honeycomb cores 12, 14, each having the usual multiplicity of end wise directed cells 16, 18, a thin imperforate facing sheet 20, a pair of perforated facing sheets 22, each having a multiplicity of perforations 24 of a substantial equal preselected cross sectional area, a single perforated facing sheet 23 having a multiplicity of perforation 25 of substantially greater preselected cross-section than those of sheets 22, and two sheets of porous fibrous material 26, which may be metallic fibrous felt or any other of a number of various types of fibrous material including stainless steel, graphite, nylon or the like. For some specific application, as in the preferred embodiment, a woven material, such as Dutch twill or the like is preferred with the crossover contacts of the various strand either bonded together or left unbonded. The perforated facing sheet 23 provides strength to the assembly and yet, due to the enlarged perforations, does not significantly affect the acoustic properties.

The preferred material for the cores and the facing sheets when utilized in a severe environment, such as an aircraft engine where weight and strength are critical requirements, is generally aluminum due to its weight versus strength characteristics. Other metals or materials may be used where the requirements differ. The honeycomb core may be constructed of phenolic, plastic, paper, Kevlar ®, or materials having the same or similar properties. Core 12 of the double degree system may be constructed of aluminum, for instance, the core bonded to the imperforate sheet 20, to provide strength to the ultimate sandwich structure 10 and the other core 14 could be of an nonstrength providing material as those materials listed above. The cell size (volume) may differ between cores 12, 14, or be of equal size depending on the sound frequency of attenuation interest.

The perforated facing sheets 22 are perforated with a plurality of small perforations 24, their size, for example, could range from 0.035 to 0.065 inches in diameter. The perforated sheet 23 is perforated with a plurality of perforations 25 substantially larger in diameter, their size, for example around 0.1875 inches. The perforations 24 provide a range from 10% to 50% actual open area to the perforated sheets 22 while the perforations 25 provide approximately 51% open area to perforated sheet 23 (see FIG. 3 for comparative perforation sizes). The perforations may be punched, drilled, or chem milled through the sheets. Chem milling is found to be advantageous because the finished perforation cross sectional area can be predetermined and the face surfaces do not require deburring, grinding, filing, polishing, etc., prior to their use in the sandwich structure. The perforations 24 may be spaced, for example, at 0.081 inch intervals, for sheets 22 and 0.250 inch intervals for sheet 23 and as an example, perforations 24 may be spaced in rectangular patterns while perforations 25 may be spaced apart in a triangular pattern. Various other spacing intervals or patterns may, however, be used equally as well to practice this invention. The imperforate sheet 20 provides a bottom closure for the cells 16 and 18 of the adjacent honeycomb cores 12 and 14 which is the lower cavity wall of the combined double degree attenuation panel utilizing the above mentioned Helmholtz cavity resonant principle.

A first thin sheet of stainless steel woven mesh material 26 is adhesively bonded by a layer of adhesive 28 to one surface of each of the perforate sheets 22 and the woven mesh surface of one composite sheet 22/26 is likewise bonded to one side of perforated sheet 23. The adhesive used is typically a nitrile rubber phenolic resin blend containing appropriate accelerators and curing agents having the trademark AF-31 manufactured by the 3M Company, having the trade name Metal Bond 4021 manufactured by Narmco, having the trademark FM-300 manufactured by Bloomingdale Aerospace Products, or any other adhesive having the same or similar characteristics as the above mentioned. The adhesive 28 generally consists of a low solid solvent solution. When the solvent is removed from these adhesive solutions by evaporation the viscosity index of the remaining adhesive is elevated.

The adhesive 28 for bonding the perforate sheets to the porous woven materials is preferably applied by spraying on the perforated sheets 22, 23, surface to be bonded a thin layer of the aforementioned adhesive. The solvent from the adhesive is then removed by evaporation. The surface attraction forces cause the adhesive layer around each perforation to take a smooth rounded, funnel like form when the solvent is removed.

The now substantially solid or highly viscous adhesive remaining retains that funnel like form or shape, and later during the final cure cycle it softens sufficiently to adhere to the porous fibrous woven material. However, the adhesive viscosity is sufficiently high so that it does not wick laterally through the pores of the porous fibrous woven material.

This inherent funneling behavior of the selected adhesive effectively enlarges the openings leading into the perforations 24 at the entrance side of the core cells providing an enhanced acoustic open area. An example is the use of a perforated sheet having an actual geometric open area of approximately 34% wherein the final product has an effective open area of approximately 42% or an increase of over 10%. This effective open area can only be attributed to the rounded funnel like effect around the opening into the perforated sheet created by the layer of adhesive treated in the manner prescribed. The thickness of this layer of adhesive is in the range of from 0.0005 to 0.005 of an inch.

This open area effect can be further enhanced by applying a thicker layer of adhesive 28 in the range of 0.003 to 0.004 of an inch, removing the solvent, as described above and then curing the adhesive layer. The thickness of this adhesive layer can be further increased by applying successive thin layers of adhesive 28 each with subsequent solvent removal and curing. Effective open areas of approximately 50% have been achieved using a sheet of perforate material 22 having an actual open area of approximately 34%. In the buildup cure method, discussed above, an additional layer of adhesive 28 is required with the solvent removed but not cured prior to the panel assembly. The buildup described above is unnecessary on the sheet of perforated material 23 because of the initially large diameter of perforation 25.

The layers of adhesive 28 between the perforate sheets 22, 23 and the sheet 26 of woven material obviously provides a layer of insulation between these sheets thus preventing any interaction (galvanic) between the dissimilar metals.

When sizing of the finished panel is required to obtain a desired specific configuration by cutting, trimming, etc., or drill through holes are required, the additional thickness of the adhesive buildup aids in maintaining a continued isolation between the perforate sheet and the porous fibrous woven mesh material.

Another method for providing continuous isolation between the perforate sheet and the porous fibrous woven material where sizing and/or drilling through the combined layers is required is the addition of thin layers of nonmetallic cloth material 29, for example, material made from fiberglass, KEVLAR ®, or the like in those areas to be sized or drilled through. A thickness in the range of 0.003 to 0.007 of an inch is found to be satisfactory even when used with single thin layers of adhesive.

METHOD OF MANUFACTURE

Referring now to FIG. 6, the first step of the manufacturing process is to clean the impervious and perforate sheets and the sheets of porous fibrous woven material to ensure that all surfactants have been removed to ensure satisfactory bonding.

The next step of the manufacturing process is to bond the porous fibrous woven materials to one surface of their respective perforate sheets. As aforementioned, the adhesive coating for bonding the perforate sheet 14 to the porous fibrous material is preferably applied by spraying on the surface of the perforate sheet a thin layer of one of the aforementioned adhesives 28 at a desired thickness. If multiple coats are desired, then the solvent is removed and the adhesive is cured between each successive layer of adhesive. The final layer of adhesive, as aforementioned, has the solvent removed but is left uncured prior to the joining of the perforate sheet to the porous fibrous woven mesh material. When thin layers of nonmetallic cloth material 29 are required at specific locations, this material is applied after or during the application of the layer or layers of adhesive. The adhesive layer and/or layers substantially cover the perforate sheet and coat the strands of the nonmetallic cloth to ensure proper bonding between the perforate sheet and the porous fibrous woven material. The solvent when present in the adhesive is then removed from the last applied adhesive layer in instances where there are more than one layer as aforementioned. After the solvent of the last applied coat is removed, the porous fibrous woven material is then placed on the coated surface and a positive force is applied between the two layers. Pressure may be applied by any well known means, such as, but not limited to a press, autoclave or the like. The pressure used is generally in the range of 50 pounds per square inch.

A primer coat 30 may be applied to the perforate sheet prior to the application of the bonding adhesive to improve this bond.

To reduce or substantially eliminate the surface energy and resulting wicking the fibers of the porous fibrous woven material 26 and the adjacent surfaces of the perforated sheet 22, to which it is attached, are covered with a nonwetting substance, such as Frekote 33, a trademarked product of Frekote, Inc., as well as other materials having the same or similar nonwetting characteristics.

After the bond between the perforated sheet 22 and the porous fibrous woven material 24 is made, the surface of the side of the perforated sheets with the perforations exposed (the side ultimately to be bonded to a cellular core) is covered with a maskant material which prevents the nonwetting solution from coating any portion of that surface. It is well known that any nonwetting (surface energy reducing) material present prevents a satisfactory bond. The maskant material of the preferred method is a sheet of heavy paper adhered to the perforation exposed surface of the perforated sheet. The adhesive used to attach the heavy paper is nonsoluble when placed in contact with a nonwetting material and is sufficiently tacky to prevent permanent adherence to the perforated sheet. This adhesive however must be sufficiently secured to the heavy paper so that if completely removed with the paper leaving the perforated surface substantially free of adhesive.

While the maskant material is secured to the perforated sheet, the porous fibrous woven material 26 and the exposed portion of the perforated sheets 22 are saturated with the selected nonwetting solution, such as Frekote 33, wherein all of the exposed fibers of the porous fibrous woven material and the exposed surfaces of the perforated sheets are covered. This nonwetting material is then allowed to dry leaving the contacted surfaces covered.

After the nonwetting material is dry, the resistant material is then removed by peeling off the heavy paper with the adhesive attached thereto from the surface of the perforated sheet. Although the adhesive generally used is completely removed from the surface of the perforated sheet any remaining residue should be removed prior to the final assembly of the components into double layer sandwich attenuation panel.

Referring now to FIGS. 1, 2 and 4 specifically, the various components are then stacked in assembly order. A layer of FM150 or an adhesive having the same of similar characteristics is applied between the imperforate sheet and the honeycomb core 12 and the perforation exposed surface of the perforated sheet 22. A layer of the same adhesive is then applied between the outer surface of the porous fibrous woven material 26 and one surface of honeycomb core 14 or both surfaces of perforated sheet 23. It should be noted that the nonwetting substance remains on the fibers of the porous fibrous woven material 26 and the adjacent surface of the perforated material 22 may include the walls of the perforations of the combined sheet to be bonded to core 14. Although it is well known that the FM150 or the like will not adhere to a surface coated with a nonwetting material, it has been found that the cell edges force the adhesive to penetrate well into the fibers of the porous fibrous material 26 adjacent thereto. Although the adhesive penetrates below and adjacent to the cell edges, it does not wick into the open surface areas of the porous fibrous woven material nor the perforations of the perforated sheet because of the coating of nonwetting material. The adhesive selected does not adhere to the fibers, as mentioned above, however, the adhesive does flow around these coated fibers and form mechanical bonds around the fibers and with the layer of AF31 or the like adhesive. The bonds are structurally sufficiently strong to maintain physical integrity between the porous fibrous woven material 22 and the cell edges of core 14.

A layer of FM150 or the like is then applied between the other surface of the honeycomb core 14 and the perforation exposed surface of the other perforated sheet 22.

Pressure in the range of 50 pounds per square inch is then applied between the imperforate sheet 20 and the outer surface of the exposed porous fibrous woven material 26 toward the center of the sandwich structure. As aforementioned, this pressure may be applied by any appropriate means as herein discussed.

In some instances it is preferable to cure the adhesive at an elevated temperature.

The cured attenuation panel 10 is now ready to be sized as required and placed into use.

Although the foregoing invention has been described in some detail by way of illustration and example for purposes of clarity of understanding, it should be understood that certain changes and modifications may be practiced within the spirit of the invention as limited only by the scope of the appended claims.

What is claimed as new and useful and desired to be secured by United States Letters Patent is:

1. A method of manufacturing adhesively bonded acoustic attenuation structure, the structural components comprising first and second honeycomb cores with a multiplicity of endwise directed cells, an imperforate facing sheet, a first, second and third perforated sheets, the third perforated sheet having perforations of a larger cross-section than the first and second perforated sheets, a first and second thin sheet of porous fibrous material; said method comprising the steps of:

(a) cleaning the components to be assembled into said acoustical attenuation structure;

(b) applying a solvent base first adhesive covering to one surface of each of said first and second perforated sheets for bonding thereto one of said first and second thin sheets of porous fibrous material;

(c) removing the solvent from said solvent base first adhesive;

(d) stacking said first perforated sheet with said first thin sheet of porous fibrous material and said second perforated sheet with said second thin sheet of porous fibrous material, applying a positive pressure between the components of each stack and curing said first adhesive;

(e) applying a covering of a maskant material to the perforation exposed surface of the now combined perforate sheets and thin sheets of porous fibrous material;

(f) applying an anti-wetting solution to the fibers of the thin sheets of porous fibrous material and the adjacent attached surface of maskant material covered perforated sheets;

(g) removing the covering of maskant of step (e);

(h) applying a layer of a second adhesive on one surface of the imperforate sheet, the perforated surfaces of the combined first and second perforated sheets and porous fibrous material and both surfaces of the third perforated sheet; and (i) stacking the first honeycomb core adjacent the adhesive applied surface of the imperforate sheet, the perforated sheet and first porous fibrous material adjacent the remaining open surface of the first honeycomb core, the third perforated sheet adjacent the porous fibrous surface of the combined first perforated sheet and first porous fibrous material, the second honeycomb core adjacent the third perforated sheet and the perforated surface of the combined second perforated sheet and second porous fibrous material adjacent the remaining open surface of the second honeycomb core, applying a positive pressure between the outer components toward the center and curing the second adhesive.

2. The method of manufacture of claim 1 including an additional step of sizing and forming the components prior to step (a).

3. The method of manufacture of claim 1, including an additional step of applying an adhesive primer to the perforate sheets prior to applying the first adhesive thereon.

4. The method of manufacture of claim 1 including an additional step of applying multiple layers of said first adhesive, removing the solvent from said first adhesive after step (b) and then repeating step (b) prior to step (c).

5. The method of manufacture of claim 1 including an additional step of adhesively bonding a piece of non-metallic cloth at selected locations between the perforate sheets and porous fibrous material after step (b) and before step (c).

6. The structure resulting from the methods of claims 1, 2, 3, 4 or 5.

* * * * *